W. H. FINK.
DISK ATTACHMENT FOR PLANTERS.
APPLICATION FILED APR. 7, 1917.
1,234,745.
Patented July 31, 1917.
2 SHEETS—SHEET 1.
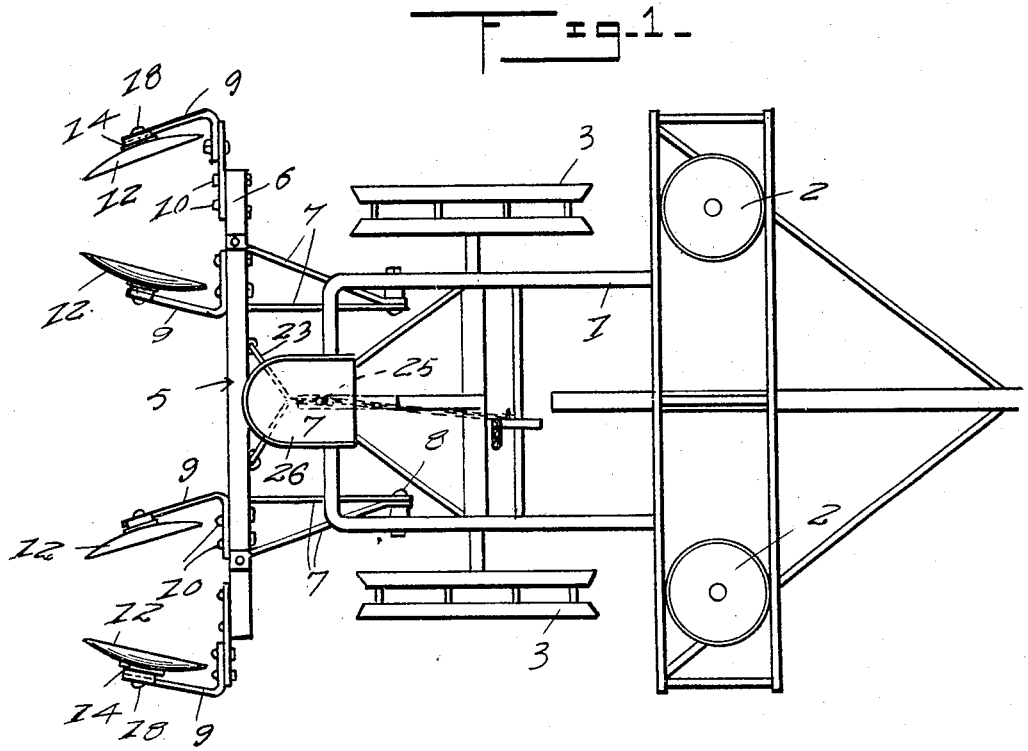
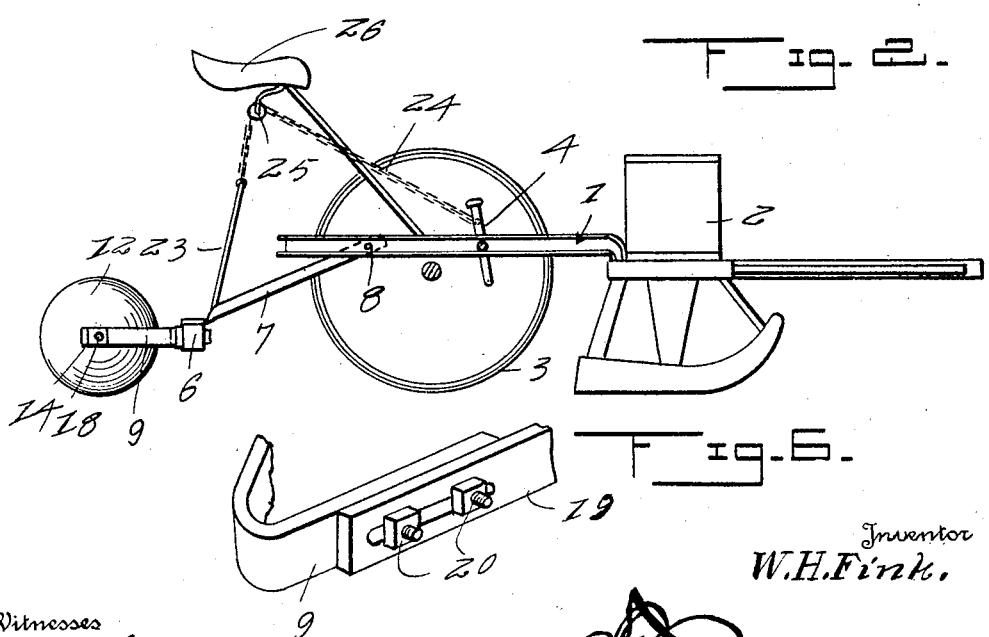
Witnesses
C R Beall
Rob W Meyer
Inventor
W. H. Fink.
By
Attorney

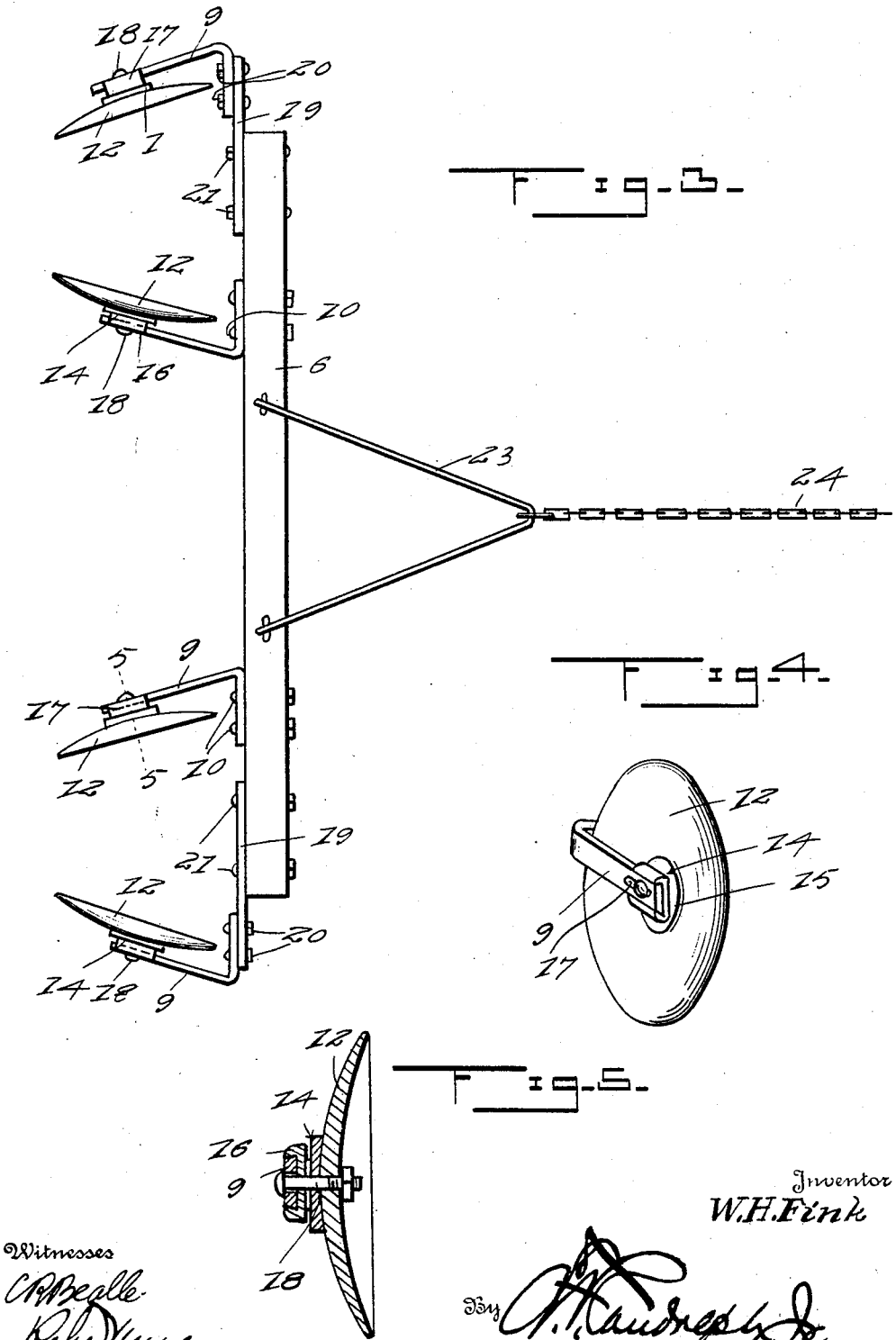

UNITED STATES PATENT OFFICE.

WILLIAM H. FINK, OF HAMPTON, IOWA.

DISK ATTACHMENT FOR PLANTERS.

1,234,745. Specification of Letters Patent. Patented July 31, 1917.

Application filed April 7, 1917. Serial No. 160,521.

*To all whom it may concern:*

Be it known that I, WILLIAM H. FINK, a citizen of the United States, residing at Hampton, in the county of Franklin and State of Iowa, have invented certain new and useful Improvements in Disk Attachments for Planters; and I do hereby declare the following to be a full, clear, and exact description of the invention, such as will enable others skilled in the art to which it appertains to make and use the same.

This invention relates to a disk attachment for corn planters, and the primary object of the invention is to provide a disk structure which may be detachably connected to the frame of an ordinary corn planter for listing the soil upon the row in which the seed is planted, thereby forming a ridge and at the same time cultivating the soil in close proximity to the hill in which the seed has been deposited for preventing the washing of the soil and will loosen the soil about the seed allowing them to gain a better headway at the commencement of their growth.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a top plan view of a planter showing the improved disk attachment applied thereto;

Fig. 2 is a side elevation of the attachment showing the same applied to a planter;

Fig. 3 is a top plan view of the disk attachment;

Fig. 4 is a detail perspective view of one of the disks and the supporting arm therefor;

Fig. 5 is a sectional view on the line 5—5 of Fig. 3; and

Fig. 6 is a fragmentary perspective view of a part of the disk structure.

Referring more particularly to the drawings, 1 designates an ordinary corn or cotton planter, which has the usual type of seed dispensing mechanisms 2 and supporting wheels 3 which are positioned in alinement with the seed dispensing mechanisms, as is ordinary in planter constructions. The planter 1 also embodies a foot lever 4 which is provided for lifting the planter. The foot lever 4 is the usual construction employed in foot lift planters and is only generically indicated in the drawings, this device being applicable for attachment to the numerous types of corn planters upon the market which embody foot levers for this purpose.

The attachment, generically indicated by the numeral 5, comprises a cross bar 6 which has a plurality of bracing bars 7 attached thereto and arranged in pairs. One of the bars 7 of each pair is disposed at an angle with respect to the other bar, as clearly shown in Fig. 1 of the drawings, and they have their forward ends lying in abutting engagement with each other and pivotally connected to the supporting frame of the planter 1 in any suitable manner, as indicated at 8. The cross bar 6 has a plurality of angled disk supporting arms 9 connected thereto by means of bolts or analogous attaching devices 10. The angled bars or arms 9 are disposed in pairs rearwardly of the wheels 3 and they angle toward each other so that the disks 12 which are carried thereby will be positioned for listing the soil upon the planted grain or seed for forming a ridge.

The disks 12 are of the usual concavo-convex construction employed in agricultural implements of this nature and they have members 14 attached thereto. The members 14 comprise disks 15 which have slides or guide ways 16 formed upon their outer surface in which slides or guide ways the ends of the arms 9 are seated. The arms 9 are provided with slots 17 through which the bolts 18 extend. The bolts 18 attach the disks 12 to the arms 9 and through the medium of the slots 17 a limited adjustment of the position of the disks may be obtained. The outermost angled disk supporting arms 9 are attached to bars 19, by suitable bolts 20 which bars are in turn detachably connected to the cross bar 6 in any suitable manner, and by any suitable type of fastening means, as indicated at 21, so that the distance between the disks may be regulated as desired. The outermost arms 9 are adjustably connected to the bars 19 as shown in Fig. 6 of the drawings.

A substantially V-shaped rod 23 is connected to the cross bar 6 and it has a chain 24 connected thereto which chain passes over a pulley 25 and is connected to the foot trip lever 4 as clearly shown in Fig. 2 of the drawings. The pulley 25 is supported in any suitable manner beneath the seat 26 of the planter. The flexible member or chain 24 is provided so that when the foot lever 4 is rocked, the disk structure will be raised or lowered, depending upon the direction of the operation of the lever.

From the foregoing description taken in connection with the accompanying drawings, the advantages of construction and of the method of operation of the improved disk attachment for planters will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. The combination with an ordinary corn planter, of a disk attachment embodying a cross bar, a plurality of angled bars attached to said cross bar, disks, a guide carried by each of said disks and engaging one side and both edges of the angled bar supporting the disk to which the guide is attached, and a bolt extending centrally through the disk, guide and angled bar for holding the disk at adjusted positions upon the angled bar.

2. The combination with an ordinary corn planter including an ordinary foot lever, of a disk attachment embodying a cross bar, a plurality of angled bars attached to said cross bar, disks, a guide carried by each of said disks and engaging one side and both edges of the angled bar supporting the disk to which the guide is attached, a bolt extending centrally through the disk, guide and angled bar for holding the disk in adjusted positions upon the angled bar, a substantially V-shaped rod connected to said cross bar, a chain connected to said V-shaped rod and to said foot lever for raising or lowering the disk attachment upon operation of the foot lever.

3. The combination with an ordinary corn planter including a supporting frame and an ordinary foot lift lever, of a disk attachment including a laterally extending cross bar, a plurality of brace bars connected to said cross bar and pivotally connected to the corn planter supporting frame, a plurality of angled disk supporting arms carried by said cross bar, the outermost of said arms being adjustably connected to the bar for lateral adjustment with respect to each other, disks adjustably carried by the outer ends of said disk carrying arms, a substantially V-shaped rod connected to said cross bar, a chain connected to said V-shaped rod and to said foot lift lever for raising or lowering the disk attachment upon operation of the foot lever.

In testimony whereof I affix my signature in presence of two witnesses.

WILLIAM H. FINK.

Witnesses:
LAVINE JONES,
F. H. RIDGEWAY.

Copies of this patent may be obtained for five cents each, by addressing the "Commissioner of Patents, Washington, D. C."